(12) United States Patent
Turányi et al.

(10) Patent No.: US 8,873,498 B2
(45) Date of Patent: Oct. 28, 2014

(54) NETWORK SHARING IN AN EVOLVED PACKET CORE NETWORK

(75) Inventors: Zoltán Richárd Turányi, Szentendre (HU); Hans Eriksson, Sollentuna (SE); Tomas Goldbeck-Löwe, Saltsjö-Boo (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 67 days.

(21) Appl. No.: 13/805,702

(22) PCT Filed: Jul. 2, 2010

(86) PCT No.: PCT/EP2010/059506
§ 371 (c)(1),
(2), (4) Date: Mar. 27, 2013

(87) PCT Pub. No.: WO2012/000564
PCT Pub. Date: Jan. 5, 2012

(65) Prior Publication Data
US 2013/0176975 A1  Jul. 11, 2013

(51) Int. Cl.
*H04W 4/00* (2009.01)
*H04W 28/16* (2009.01)
*H04W 72/08* (2009.01)

(52) U.S. Cl.
CPC ............ *H04W 72/087* (2013.01); *H04W 28/16* (2013.01)
USPC ........................................................ 370/329

(58) Field of Classification Search
CPC combination set(s) only.
See application file for complete search history.

(56) References Cited

U.S. PATENT DOCUMENTS

| | | | |
|---|---|---|---|
| 2007/0165630 A1* | 7/2007 | Rasanen et al. | 370/389 |
| 2009/0225719 A1* | 9/2009 | Zhi et al. | 370/329 |
| 2009/0252049 A1* | 10/2009 | Ludwig et al. | 370/252 |
| 2009/0268635 A1* | 10/2009 | Gallagher et al. | 370/254 |
| 2009/0268722 A1* | 10/2009 | Gallagher et al. | 370/352 |
| 2009/0270097 A1* | 10/2009 | Gallagher et al. | 455/435.1 |
| 2009/0270098 A1* | 10/2009 | Gallagher et al. | 455/435.1 |
| 2009/0270099 A1* | 10/2009 | Gallagher et al. | 455/435.1 |
| 2012/0176997 A1* | 7/2012 | Rydnell et al. | 370/329 |
| 2012/0320801 A1* | 12/2012 | Yang et al. | 370/259 |

OTHER PUBLICATIONS

International Search Report, PCT Application No. PCT/EP2010/059506, Apr. 6, 2011.
Written Opinion of the International Searching Authority, PCT Application No. PCT/EP2010/059506, Apr. 6, 2011.
International Preliminary Report on Patentability, PCT Application No. PCT/EP2010/059506, Jun. 14, 2012.

* cited by examiner

*Primary Examiner* — Clemence Han
(74) *Attorney, Agent, or Firm* — Myers Bigel Sibley & Sajovec, P.A.

(57) ABSTRACT

One aspect pertains to a method of enabling an Evolved Packet Core (EPC) network to implement predetermined Quality of Service (QoS) resource policies applied to subscriber/service groups operating via the network. The method comprises receiving a request for QoS resources to be provided to a bearer for traffic of a user of a subscriber/service group from which the request originated. A Resource Class (RC) parameter is assigned to the request. The RC parameter identifies a resource partition and the originating subscriber/service group. A Gx-Request that includes the RC parameter is forwarded to the EPC network to invoke application of the requested QoS resources so as to establish a bearer in accordance with the predetermined policies identifiable from the RC. Other aspects pertain to EPC network nodes configured accordingly.

17 Claims, 4 Drawing Sheets

NETWORK SHARING IN AN EVOLVED PACKET CORE NETWORK

CROSS-REFERENCE TO RELATED APPLICATION

This application is a 35 U.S.C. §371 national stage application of PCT International Application No. PCT/EP2010/059506, filed on 2 Jul. 2010. The above-referenced PCT International Application was published in the English language as International Publication No. WO 2012/000564 A1 on 5 Jan. 2012. The disclosure of the above-referenced application is hereby incorporated herein in its entirety by reference.

FILED OF THE INVENTION

The present invention relates to a method and associated apparatus that enables an Evolved Packet Core (EPC) network to implement resource policies, such as the sharing of bearer resources, applied to subscriber/service groups operating via the network.

BACKGROUND

The Third Generation Project Partnership (3GPP) has developed the System Architecture Evolution (SAE) as the core network architecture of its future and Long Term Evolution (LTE) wireless mobile telecommunications standard. The main component of the SAE architecture is the Evolved Packet Core (EPC). The LTE/SAE network includes network entities supporting the user and control planes.

The Evolved NodeB (eNodeB) provides the LTE air interface and performs radio resource management for the evolved access system. The EPC will serve as the equivalent of General Packet Radio Service (GPRS) networks.

The Mobility Management Entity (MME), which is the key control-node for the access-network. It is involved in the bearer activation/deactivation process and is also responsible for choosing the Serving Gateway (SGW) when a User Entity (UE) initially attaches to the network and at handovers involving Core Network (CN) node relocation. It is also responsible for authenticating the user (by interacting with the HSS).

The Serving Gateway (SGW) routes and forwards user data packets, while also acting as the mobility anchor for the user plane during inter-eNodeB handovers and as the anchor for mobility between LTE and other 3GPP technologies. It also manages and stores UE contexts, e.g. parameters of the IP bearer service and network internal routing information.

The Public Data Network gateway (PDN-GW or PGW) provides connectivity from the UE to external data networks (PDNs) by being the point of exit and entry of traffic for the UE. A UE may have simultaneous connectivity with more than one PGW for accessing multiple PDNs. The PGW performs policy enforcement, packet filtering for each user, charging support, lawful Interception and packet screening. Another key role of the PGW is to act as the anchor for mobility between 3GPP and non-3GPP technologies.

3GPP has standardized the Evolved Packet Core (EPC) starting from Release 8. The EPC contains a sophisticated policy control framework together with a detailed bearer mechanism for providing a variable Quality of Service (QoS) treatment to selected traffic. The standard specifies three key parameters that represent QoS for a bearer:

1. QCI: this dictates the packet level treatment for the packets traveling on the bearer, e.g., high reliability, low delay, or just best effort.
2. MBR and GBR: these specify, respectively, the maximum and guaranteed bitrates for the bearer.
3. ARP: the Allocation and Retention Priority, which is a value that governs admission control decisions for the bearer.

There is also an Aggregated Maximum Bitrate (AMBR) parameter, which is the maximum limit of the user's combined traffic (all bearers), whereas the parameters listed above are applied per-bearer.

Quoting from 3GPP Technical Specification 23.401:

"The ARP shall contain information about the priority level (scalar), the pre-emption capability (flag) and the pre-emption vulnerability (flag). The primary purpose of ARP is to decide whether a bearer establishment/modification request can be accepted or needs to be rejected due to resource limitations (typically available radio capacity for GBR bearers). The priority level information of the ARP is used for this decision to ensure that the request of the bearer with the higher priority level is preferred. In addition, the ARP can be used (e.g. by the eNodeB) to decide which bearer(s) to drop during exceptional resource limitations (e.g. at handover). The pre-emption capability information of the ARP defines whether a bearer with a lower ARP priority level should be dropped to free up the required resources. The pre-emption vulnerability information of the ARP defines whether a bearer is applicable for such dropping by a pre-emption capable bearer with a higher ARP priority value. Once successfully established, a bearer's ARP shall not have any impact on the bearer level packet forwarding treatment (e.g. scheduling and rate control). Such packet forwarding treatment should be solely determined by the other EPS bearer QoS parameters: QCI, GBR and MBR, and by the AMBR parameters."

Figure 1:
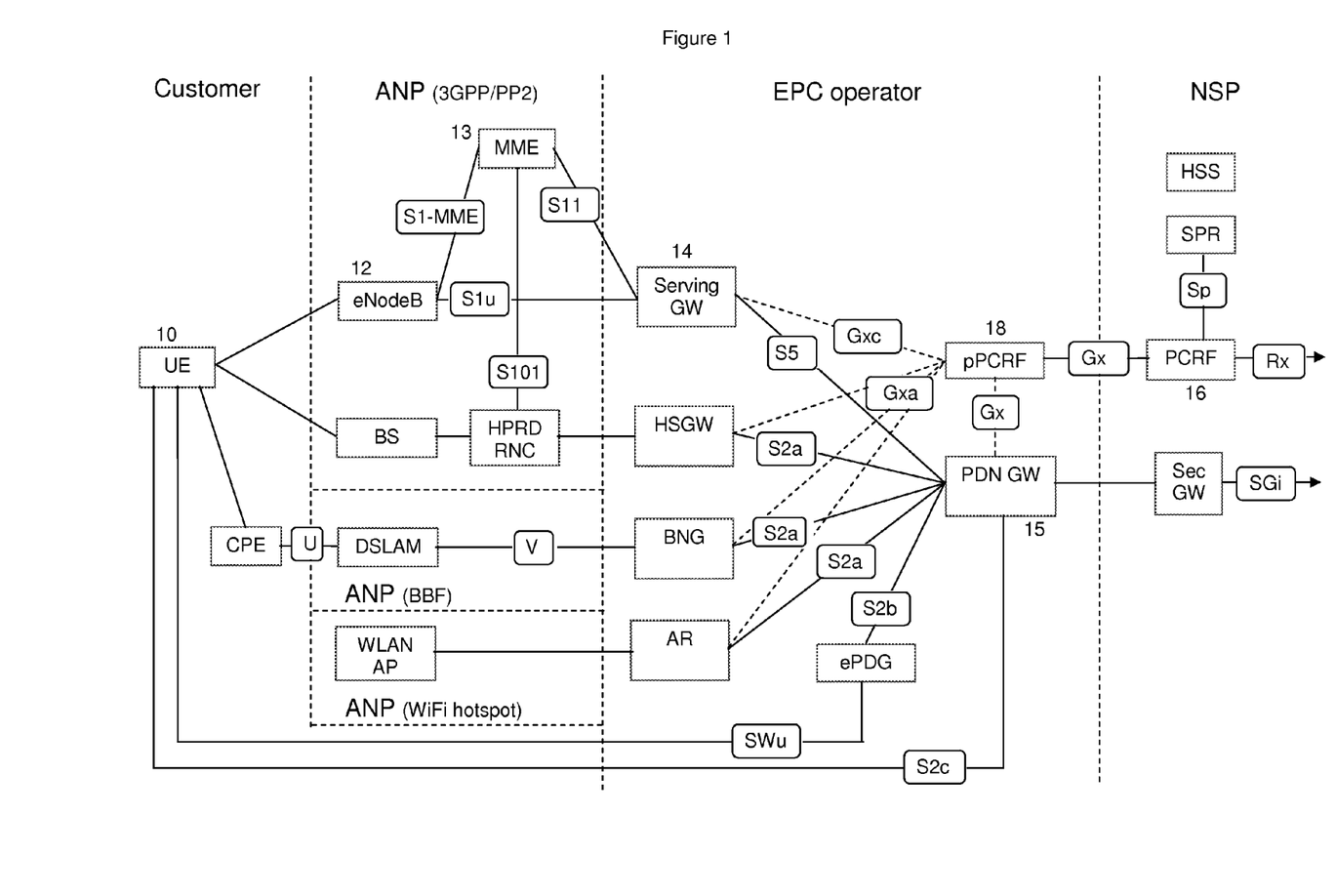
FIG. 1 is a schematic illustration of the EPC architecture and interactions with a Core Network, and various Access Networks providing access to a customer's UE.

FIG. 1 is a schematic representation showing, for the purpose of the present disclosure, elements of the EPC architecture. These interact on one side with the CN, operated by a Network Service Provider (NSP), and on the other side with various Access Network technologies, operated by Access network Providers (ANPs) providing access to a customer's UE 10. Various network nodes are depicted as well as the designated interfaces between nodes. For the purposes of the present discussion it will be assumed that the UE 10 accesses a 3GPP/PP2 (LTE) access network, including eNodeB 12 and MME 13. The EPC network is operated by the EPC operator who is responsible for operation of the various gateway nodes, including SGW 14 and PDN-GW 15. The NSP operates an IMS network, communicating to/from the EPC network via a Policy and Charging Rules Function (PCRF) 16 over the Gx interface.

The logic of applying QoS is as follows. (This is a simplified and conceptual description of the 3GPP EPC mechanisms. For more details see 3GPP Technical Specification 23.401 and related documents.)

An application Function (AF—not shown) requests QoS for a piece of traffic from the PCRF 16 over the Rx interface. The traffic is described by IP flow filters. The AF also specifies what application (video, voice, etc.) this flow will carry and its bandwidth.

The PCRF 16 looks up which user the requested traffic belongs to. Then it checks its policy database to determine what QoS should be provided to this application for this user. Based on this it determines the QCI and ARP values.

The PCRF 16 requests configuration of the QoS rules (IP flow filters, QCI, ARP and bandwidth values) in the EPC network using the Gx interface.

A new bearer is set up (or an existing bearer is modified) using the received parameters. Each network node checks if it has enough resources to fulfill the request (honoring the ARP value). It is especially important for the access network to do this check for air interface resources, so in this example this is done by the eNodeB 12 in the LTE network, whereas in a Wideband Code Division Multiple Access (WCDMA) air interface, for example, this would be done by the Radio Network Controller (RNC). If the resources are adequate the bearer is set up. Incoming data packets are carried by the bearer having the QoS specified by the QCI.

Note that, in accordance with the requirements of LTE, the EPC supports non-3GPP accesses, such as fixed, WiFi or WiMax. In that case the access network would not necessarily set up bearers, but a different terminology or mechanism is used.

Nevertheless the main principles are the same: the PCRF determines the QoS parameters and the network performs the admission control and packet scheduling.

A disadvantage of the current EPC operation becomes apparent if the EPC is shared between multiple NSPs. For example, an EPC operator may own or rent a transport network, and own and operate EPC nodes. It may also be an ANP that owns or rents wireless or wired access networks. It can therefore provide a complete IP access network service to NSPs, who own subscribers. Such an IP access network service would comprise:

Secure physical connectivity to subscriber devices from all (any) of the access networks they support up to the location of NSP entities.

Seamless Mobility between and within access networks.

QoS provisioning and policy enforcement at the request of NSPs.

Facilitating Authentication, Authorization and Accounting (AAA) interaction between the user and the NSP (i.e. relaying of AAA messages from a user to the NSP).

Any other value-added, in-path service, such as transcoding, caching, Legal Intercept, etc. that may be specified in an agreement with the NSPs.

The NSPs in this arrangement do not have to concern themselves with managing the bearer resources, such as the bandwidth, or the flow of data between the devices (i.e. the bitpipe). Instead, they can focus on customer experience and services.

It is envisaged that the NSPs would make policy decisions themselves and so for this reason the PCRF 16 is located in the NSP network, as shown in FIG. 1. However, in order to provide a single point of contact for policy related requests, the EPC operator may decide that it is best not to allow the PCRF nodes of NSPs to connect directly to the GW nodes of the EPC, but instead to provide a proxy node that would receive Gx messages from the NSP, make local adjustments (such as QCI translation and ARP adjustments) and pass the messages on to the relevant GW nodes. This proxy node is shown as a p-PCRF node 18 in FIG. 1, although this is not a specified EPC entity and is not essential for the purposes of the invention to be discussed below, which is equally applicable in cases where the PCRFs connect directly to the GW nodes.

With the current Gx interface parameters, it is not possible to implement a scheme where, for example, the capacity of the bearers used by two NSPs is split. For example, a Service Level Agreement (SLA) between NSPs may specify that the capacity is split between the NSPs according to a predefined percentage, say 50%-50%. In the case of admission control, this would require the admission control decision to take into account how much bearer traffic is currently being used by each NSP. However, this information is not currently available in the network nodes making admission control decisions (such as the eNodeB or RNC, among others). The network nodes also have no information about which NSP originated any new incoming request for bearer resources.

A similar situation arises for packet scheduling of non-guaranteed bit-rate traffic. The network can apply fair scheduling between users, but if, for example at a cell, one NSP has many more users than another NSP, then the resources are currently provided to NSPs in proportion to the numbers of current users, and not 50%-50% as the SLA would require. Again this is due to the fact that the nodes of the network have no information as to which traffic belongs to which NSP.

The present invention has been conceived with the foregoing in mind.

SUMMARY

According to a first aspect of the invention, there is provided a method of enabling an EPC network to implement predetermined QoS resource policies applied to subscriber/service groups operating via the network. The method comprises receiving a request for QoS resources to be provided to a bearer for traffic of a user of a subscriber/service group from which the request originated. A Resource Class, RC, parameter is assigned to the request. The RC parameter identifies a resource partition and the originating subscriber/service group. A Gx-Request that includes the RC parameter is forwarded to the EPC network to invoke application of the requested QoS resources so as to establish a bearer in accordance with the predetermined policies identifiable from the RC.

In embodiments, the QoS resource policies may include a policy to share resources between two or more subscriber/service groups. The subscriber/service groups may include one or more of a Network Service Provider, NSP, a NSP that is part of a larger enterprise, a subscriber group and a femto-cell.

In embodiments, the EPC node may be a node that makes an admission control decision in accordance with the predetermined policies. The EPC node may be a node that makes a packet scheduling decision in accordance with the predetermined policies.

The method may further comprise obtaining the RC for the requested QoS resources prior to assigning the RC to the request. The RC may be obtained from an AF that originated the request, or may be generated from an identity of the originating AF, or may be provided by a gateway node through which the user accesses the network during a session establishment, or may be selected based on information provided by a gateway node through which the user accesses the network, or may be obtained from a central database storing RC parameters.

The method may include the step of configuring QoS rules to determine the QoS resources for the request.

According to a second aspect of the invention, there is provided an EPC network node configured to receive a request for QoS resources to be provided to a bearer for traffic of a user of a subscriber/service group. The node is also configured to assign a Resource Class, RC, parameter to the request, the RC parameter identifying a resource partition and the originating subscriber/service group, to insert the RC parameter into a Gx-Request specifying the QoS resources requested and to forward the Gx-Request to the EPC network for applying the requested QoS resources in accordance with predetermined policies identifiable from the RC.

In embodiments, the EPC network node may be further configured to obtain the RC parameter based on an identity of the originating subscriber/service group. The node may be a PCRF or a node acting as a proxy to a PCRF. The EPC node may be further configured to apply QoS rules to determine the QoS resources for the request.

According to a third aspect of the invention there is provided an EPC network node configured to receive a Gx-Request for the provision of QoS resources to a bearer for traffic of a user belonging to a subscriber/service group. The Gx-Request includes a RC identifying a resource partition and the originating subscriber/service group. The node is also configured to identify predetermined policies of the subscriber/service group identified by the RC, and to invoke application of the predetermined policies to the QoS resources provided to the bearer.

It will be apparent that an important concept is the extension of the bearer (or Gx) parameters with an additional parameter, the resource class (RC). This parameter allows the configuration of additional policies into the nodes making the admission control decision (such as splitting resources between RC=1 and RC=2). This then allows the EPC network to easily configure network sharing policies. The RC parameter may also be included as a bearer parameter along with QCI and ARP, so that the eNodeB (or any other node making admission control or scheduling decisions) also receives the RC parameter.

Figure 2:
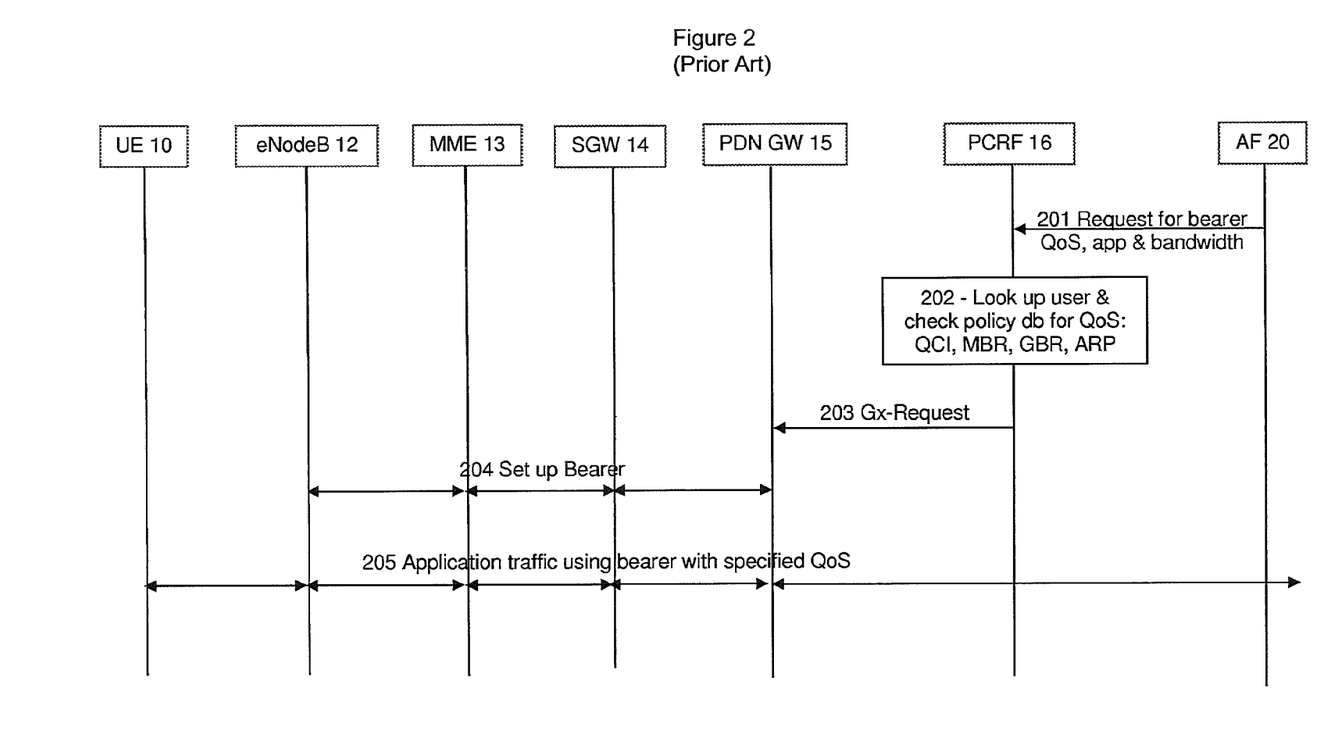
FIG. 2 is a signal flow diagram illustrating how bearer resources are provided in accordance with current standards/proposals.

Referring to FIG. 2, there is shown the procedure by which a bearer is set up in accordance with current standards and practice. At step 201, an AF 20 sends a request for a bearer QoS to the PCRF 16, together with a name or reference to the application and its required bandwidth. Note that this may not be the first request, but could be a request to modify the QoS of an already established bearer. At step 202, the PCRF 16 performs a look-up of the user to which the request relates and checks the policy database for the QoS parameters—QCI, MBR, GBR and ARP, as described above. Then at step 203, the PCRF 16 sends a request for the bearer resources over the Gx interface towards the PDN-GW 15 in the EPC network. Now at step 204, the PDN-GW invokes the setting up of the bearer with the requested QoS in accordance with currently established procedures. This procedure involves the SGW 14, MME 13 and eNodeB 12. For example, the Gx Request is sent to the PDN-GW 15, which invokes bearer setup towards the SGW 14 (using the GPRS tunnelling protocol GTP-C), the SGW 14 passes it on to the MME 13 (using GTP-C), the MME 13 passes it on to the eNodeB (using the S1AP protocol). Once the bearer has been set up, at step 205, the application traffic can flow to/from the UE 10. As previously explained, the procedure shown in FIG. 2 does not allow the bearer to be set up taking account of NSP policy requirements, such as a split in the bearer capacities shared between NSPs.

Note that, in addition to the procedure shown in FIG. 2, there is another mode of operation defined for EPC and described in 3GPP TS 23.402. This is used when the protocol between the PDN-GW 15 and the SGW 14 is not GTP, but PMIP (Proxy Mobile IP), which cannot transmit bearer or QoS related information. In that case the PCRF 16 sends the Gx request to the PDN-GW 15 and also to the SGW 14 (using another, similar Gx interface). The principles of the present invention are not concerned with the particular mode and apply equally to both. Also, these modes of operation relate to 3GPP accesses (WCDMA or LTE), but EPC can also connect to non-3GPP accesses, to which the principles may also be applied.

Figure 3:
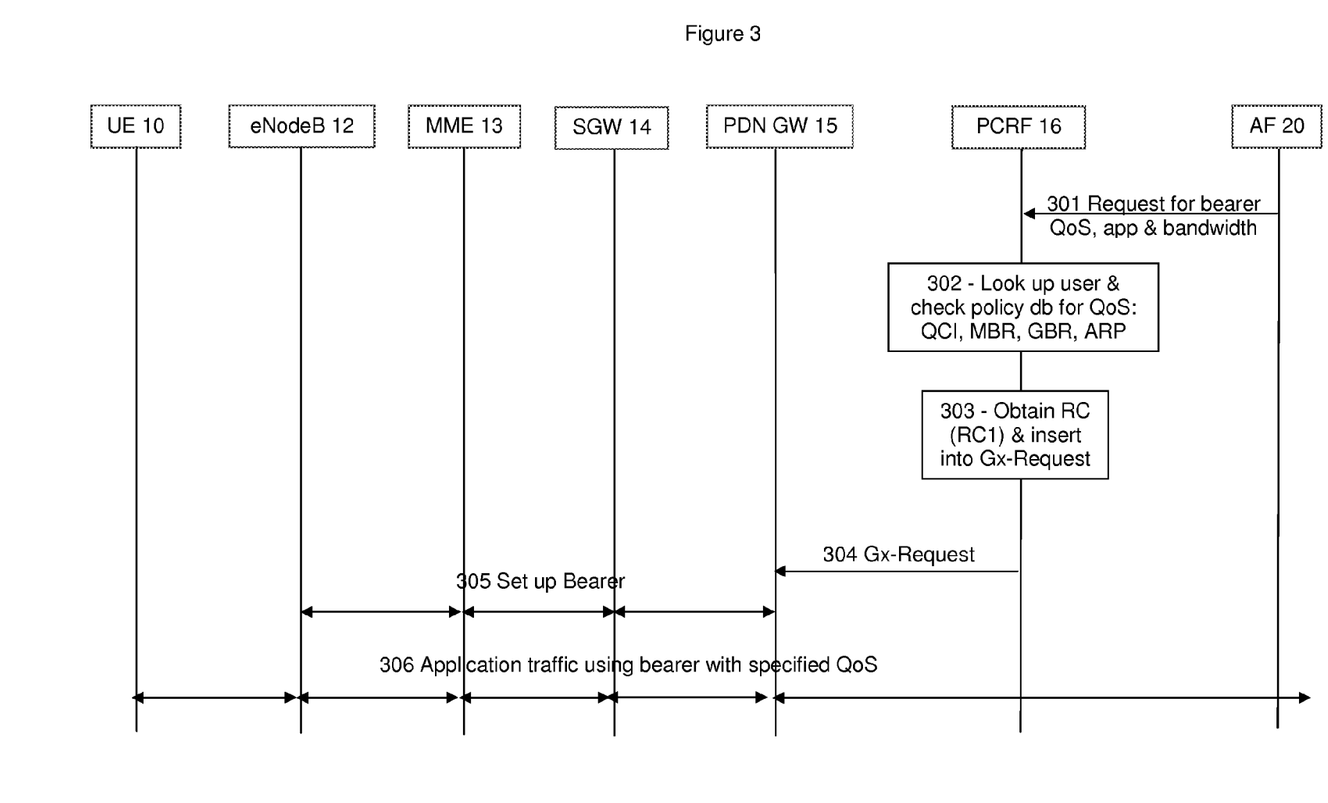
FIG. 3 is a signal flow diagram illustrating how bearer resources are provided in accordance with one embodiment.

The procedure shown in FIG. 3 enables the setting up of the bearer to take account of NSP policy requirements, such as the aforementioned split in the bearer capacities of sharing NSPs. The key idea is to introduce an additional bearer (or Gx) parameter, the resource class (RC). The RC parameter represents a resource partition. Each bearer (or more precisely Gx request) is assigned to one of a number of predefined resource partitions (unassigned bearers can go to a special "unassigned" partition). The actual RC parameter values are assigned by the EPC operator to each resource class. For example, a number (RC=1, RC=2 . . . etc. could be assigned to each NSP). Then resources can be assigned to each NSP by configuring admission control and packet scheduling nodes to provide more or less resources to a specific NSP by referring to the RC number assigned to that NSP. Similarly, in the Policy and Charging Control (PCC) system, requests coming from an NSP have to include the RC number of that NSP.

As shown in FIG. 3, steps 301 and 302 are the same as steps 201 and 202 in FIG. 2 when a request for bearer resources is sent from AF 20 to PCRF 16. However, now, at step 303, the PCRF obtains the RC value applicable to the request. This may be the RC value assigned to the NSP, or to another subscriber or service group. As noted above, an NSP can be just a division in a bigger operator company such as Enterprise Services or Public Subscriber services or Youth Market Segment, etc. Resource Classes can also be used to represent other entities than NSPs, such as subscriber groups. There are a variety of ways that the PCRF 16 can obtain the RC value, and these are discussed further below.

At step 304 the PCRF forwards the Gx-Request, as in FIG. 2, step 203, except that now the Gx-Request includes the RC parameter value. Now, at step 305 the EPC nodes (eNodeB 12, MME 13, SGW 14 and PDN-GW 15) set up the bearer taking account of the RC parameter so that the policy relating to the NSP (or other subscriber/service group) can be implemented. The implementation of such policies is discussed further below. Once the bearer has been set up, at step 306, the application traffic can flow to/from the UE 10.

The RC parameter can be obtained a number of ways, including any of the following.

The AF 20 can provide the RC value (or some equivalent) in case it serves multiple NSPs (or has some other reason for the request to be on a particular Resource Class).

The PCRF 16 can generate the RC parameter from the identity of the AF 20 that originated the request. This is applicable if the PCRF 16 is part of a common EPC and the AF belongs to a different NSP (i.e. the NSP is not responsible for the PCRF 16).

The pPCRF node 18 (if it exists) can also add the RC parameter, based on the PCRF 16 that it receives the request from (this would apply if the NSP is responsible for the PCRF 16).

The PDN-GW 15 or a Gateway GPRS Support Node (GGSN) node can indicate the RC of the user at IP-CAN session establishment time. This allows applying the same RC for all bearers of the user (even UE initiated) based on the AAA information.

In a similar fashion, the PDN-GW 15 (or GGSN) can indicate if the user has attached through a home eNodeB (or an enterprise pico BS, which is a small base station equivalent of an eNodeB installed typically for indoor coverage, or a femtocell for residential use) and the PCRF can select the RC to apply based on this information. This option allows for policies to be implemented for the total resource consumption of a group of users, such as a femtocell, or of a group of femtocells collectively, or a specific enterprise installation.

The RC value could be stored together with the user data and service data in a centralized database called the User Data Repository (UDR) - part of the User Data Convergence (UDC) architecture standardized in 3GPP TS 23.335. This would allow the RC value to be based on user identity and/or service as chosen by the EPC operator. This option could also enable all high priority traffic from that operator to have one unique RC value. This option also provides flexibility for the operator to tailor the usage of the RC value.

Use of the RC parameter enables Nodes making admission control decisions to be programmed with additional policies that take account of the RC value. Such nodes primarily include the eNodeB, Home eNodeB and RNC, but could also include GPRS Support (GSN) and Gateway (GW) nodes, if those nodes make admission control decisions. Examples of such policies include the following.

- Down-prioritize the ARP of the request depending on utilization in various RCs. This would allow, for example, maintaining a high ARP value for a bearer even if the RC it belongs to is over-represented but has a low average ARP. As a result the request has a higher chance of refusal for the over-represented RC in the case of an originally average ARP
- Make direct accept/reject decisions based on RC utilization without honoring the ARP.
- Set maximum limits to the combined accepted traffic in an RC (perhaps on a per QCI basis).
- Change acceptance levels per ARP depending on the prevailing RC utilization.
- Change pre-emption related values of ARP depending on RC utilization.
- Make pre-emption decisions differently based on RC utilization, such as selecting from an over-utilized RC, instead of another one.

Use of the RC parameter also enables Nodes making packet scheduling decisions to be programmed with additional policies that consider the RC value. Such nodes include primarily eNodeB, NodeB for High Speed Packet Access (HSPA), Home eNodeB and Radio Network Controller (RNC). But they may also include any GSN or GW node, as well. As well as the actual packet scheduling of traffic in, say, eNodeBs, scheduling in this context may also include selecting the transport pipe in gateways. Say, for example, the operator has defined two transport pipes between a SGW and an eNodeB, each one for the traffic of one NSP, then the SGW can assign traffic to each of the pipes based on RC.

Such policies may:
- Aim to achieve a pre-arranged resource split between RCs in order to fulfill a SLA. The split may be a split of all traffic of that RC, or just for non-guaranteed traffic, or for any other defined part of the traffic.
- Dynamically lower the QoS of the traffic of one RC if it is over-represented. For example, this may include worsening reliability (Hybrid Automatic Repeat Request—HARQ—settings) or others.
- Setting maximum limits for the combined amount of resources assigned to traffic in an RC (perhaps on a per QCI basis).

For the purposes of splitting or sharing resources between between RCs, the comparison between RCs may be made either in terms of useful throughput, or in terms of radio resources used (in an eNode), or any other defined measure of resource utilisation.

In summary, the RC parameter can be used in three ways:
1. for admission control
2. for selecting transport parameters
3. for scheduling of packets.

Figure 4:
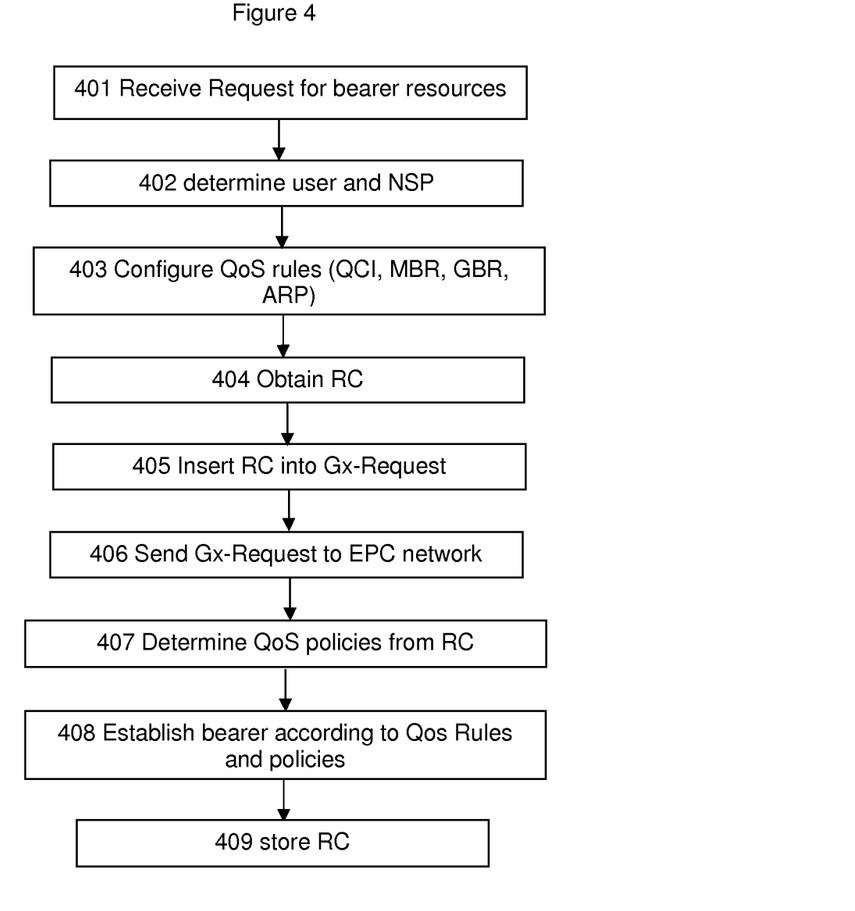
FIG. 4 is a flow chart illustrating the principal method steps in accordance with an embodiment.

FIG. 4 illustrates the sequence of steps involved. At step 401 a request for bearer resources is received (e.g. from an AF). At step 402 the user and NSP (or other user/service group) is identified using one of the methods described above. At step 403 the QoS rules are configured so that the parameters QCI, MBR, GBR and ARP are determined for the request. At step 404 the RC of the NSP (or other user/service group) is obtained using one of the methods described above. At step 405, the RC is inserted into a Gx-Request and, at step 406 the Gx-Request is sent to the EPC network. At step 407 the RC parameter is used to identify the appropriate policies (such as resource sharing as stipulated in a SLA) that apply to the particular user/service group (e.g. NSP). At step 408, the EPC network invokes bearer establishment and any nodes responsible for applying RC-related policies to admission control decisions or to packet scheduling decisions (such as those described above) can apply these using the RC value. Finally, at step 409 the RC value is stored in the network so that it is available for any subsequent decisions (e.g. scheduling decisions). The above described methodology and associated system apparatus provide for the implementation of resource sharing policies in the case of a shared EPC and/or Access Network, within the existing EPC architecture and policy control infrastructure.

The invention claimed is:

1. A method of enabling an Evolved Packet Core (EPC) network to implement Quality of Service (QoS) resource policies applied to subscriber/service groups operating via the network, the method comprising:
   - receiving a request for QoS resources to be provided to a bearer for traffic of a user of a subscriber/service group from which the request originated;
   - assigning a Resource Class (RC) parameter to the request, the RC parameter identifying a resource partition and the originating subscriber/service group;
   - forwarding a Gx-Request that includes the RC parameter to the EPC network to invoke application of the requested QoS resources and establish a bearer in accordance with QoS resource policies identifiable from the RC parameter; and
   - using the RC parameter in the EPC network for admission control and/or scheduling of data packets.

2. The method of claim 1, wherein the QoS resource policies include a policy to share resources between two or more subscriber/service groups.

3. The method of claim 1 wherein the subscriber/service groups include one or more of a Network Service Provider (NSP), a NSP that is part of a larger enterprise, a subscriber group, and a femtocell.

4. The method of claim 1 wherein the RC parameter is used at an EPC node that makes an admission control decision in accordance with the QoS resource policies.

5. The method of claim 1 wherein the RC parameter is used at an EPC node that makes a packet scheduling decision in accordance with the QoS resource policies.

6. The method of claim 1 further comprising obtaining the RC parameter for the requested QoS resources prior to assigning the RC parameter to the request.

7. The method of claim 6 wherein the RC parameter is obtained from an application function (AF) that originated the request, or is generated from an identity of the originating AF, or is provided by a gateway node through which the user accesses the network during a session establishment, or is selected based on information provided by a gateway node through which the user accesses the network, or is obtained from a central database storing RC parameters.

8. The method of claim 1 further comprising configuring QoS rules to determine the QoS resources for the request.

9. An Evolved Packet Core (EPC) network node configured:
   to receive a request for Quality of Service (QoS) resources to be provided to a bearer for traffic of a user of a subscriber/service group,
   to assign a Resource Class (RC) parameter to the request, the RC parameter used by nodes of the EPC network for admission control and/or scheduling of data packets and identifying a resource partition and an originating subscriber/service group,
   to insert the RC parameter into a Gx-Request specifying the QoS resources requested, and
   to forward the Gx-Request to the EPC network for applying the requested QoS resources in accordance with policies identifiable from the RC parameter.

10. The EPC network node of claim 9 further configured to obtain the RC parameter based on an identity of the originating subscriber/service group.

11. The EPC network node of claim 9 wherein the node is one of: a Policy and Charging Rules Function PCRF and a node acting as a proxy to a PCRF.

12. The EPC node of claim 11 wherein the node is further configured to apply QoS rules to determine the QoS resources for the request.

13. An Evolved Packet Core (EPC) network node configured:
   to receive a Gx-Request for provision of Quality of Service (QoS) resources to a bearer for traffic of a user belonging to a subscriber/service group, the Gx-Request including a Resource Classl (RC) parameter identifying a resource partition and the originating subscriber/service group;
   to identify policies of the subscriber/service group identified by the RC parameter,
   to invoke application of the policies to the QoS resources provided to the bearer; and
   to use the RC parameter for admission control and/or scheduling of data packets.

14. The EPC network node of claim 13, wherein the node is configured to make admission control decisions and the policies include additional polices programmed at the EPC node that take account of the RC parameter.

15. The EPC network node of claim 14, wherein the node is one of: an eNodeB; a Home eNodeB; a Radio Network Controller (RNC); a GPRS Support Node (GSN); and a Gateway, (GW) node.

16. The EPC network node of claim 13, wherein the node is configured to make packet scheduling decisions and the policies include additional polices programmed at the EPC node that take account of the RC parameter.

17. the EPC network node of claim 16, wherein the node is one of an eNodeB; a NodeB for High Speed Packet Access (HSPA); a Home eNodeB; a Radio Network Controller (RNC); a GPRS Support Node (GSN); and a Gateway (GW) node.

\* \* \* \* \*

UNITED STATES PATENT AND TRADEMARK OFFICE
CERTIFICATE OF CORRECTION

PATENT NO. : 8,873,498 B2  
APPLICATION NO. : 13/805702  
DATED : October 28, 2014  
INVENTOR(S) : Turanyi et al.

Page 1 of 1

It is certified that error appears in the above-identified patent and that said Letters Patent is hereby corrected as shown below:

In the claims,

In Column 10, Line 5, in Claim 11, delete "PCRF" and insert -- (PCRF) --, therefor.

In Column 10, Line 7, in Claim 12, delete "EPC" and insert -- EPC network --, therefor.

In Column 10, Line 14, in Claim 13, delete "Classl" and insert -- Class --, therefor.

In Column 10, Line 17, in Claim 13, delete "parameter," and insert -- parameter; --, therefor.

In Column 10, Lines 28-29, in Claim 15, delete "Gateway," and insert -- Gateway --, therefor.

In Column 10, Line 34, in Claim 17, delete "the EPC" and insert -- The EPC --, therefor.

Signed and Sealed this  
Twenty-eighth Day of April, 2015

Michelle K. Lee  
*Director of the United States Patent and Trademark Office*